United States Patent
Zhang et al.

(10) Patent No.: US 7,421,303 B2
(45) Date of Patent: Sep. 2, 2008

(54) PARALLEL LCP SOLVER AND SYSTEM INCORPORATING SAME

(75) Inventors: Lihua Zhang, Chesterfield, MO (US);
Richard Tonge, St. Louis, MO (US);
Dilip Sequeira, St. Louis, MO (US);
Monier Maher, St. Louis, MO (US)

(73) Assignee: NVIDIA Corporation, Santa Clara, CA (US)

(*) Notice: Subject to any disclaimer, the term of this patent is extended or adjusted under 35 U.S.C. 154(b) by 734 days.

(21) Appl. No.: 10/815,721

(22) Filed: Apr. 2, 2004

(65) Prior Publication Data
US 2005/0165874 A1    Jul. 28, 2005

Related U.S. Application Data

(60) Provisional application No. 60/537,920, filed on Jan. 22, 2004.

(51) Int. Cl.
*G06F 19/00* (2006.01)

(52) U.S. Cl. .................. 700/45; 345/419; 345/473
(58) Field of Classification Search ................ 345/419, 345/473, 475, 644; 706/10, 19, 45; 712/2–7, 712/10–18, 28, 32–36; 700/45, 1
See application file for complete search history.

(56) References Cited

U.S. PATENT DOCUMENTS

| 5,938,530 | A | * | 8/1999 | Watanabe | 463/31 |
| 5,966,528 | A | * | 10/1999 | Wilkinson et al. | 712/222 |
| 7,075,541 | B2 | * | 7/2006 | Diard | 345/505 |
| 2003/0179205 | A1 | * | 9/2003 | Smith et al. | 345/474 |
| 2004/0062443 | A1 | * | 4/2004 | Yen et al. | 382/209 |
| 2004/0075623 | A1 | * | 4/2004 | Hartman | 345/1.3 |

* cited by examiner

*Primary Examiner*—Kidest Bahta
(74) *Attorney, Agent, or Firm*—Patterson & Sheridan, LLP

(57) ABSTRACT

A Linear Complementarity Problem (LCP) solver is characterized by multiple execution units operating in parallel to implement a competent computational method adapted to resolve physics-based LCPs in real-time.

25 Claims, 7 Drawing Sheets

$$\begin{pmatrix} x \\ x_1 \\ x_2 \\ \cdot \\ \cdot \\ \cdot \\ x_n \end{pmatrix} \begin{pmatrix} u \\ u_1 \\ u_2 \\ \cdot \\ \cdot \\ \cdot \\ u_n \end{pmatrix} \begin{pmatrix} j \\ j_{11} \; j_{12} \cdot \cdot \cdot \\ j_{21} \\ \cdot \quad\quad \cdot \\ \cdot \quad\quad \cdot \\ \cdot \quad\quad \cdot \\ j_{n1} \cdot \cdot \cdot j_{nn} \end{pmatrix} \begin{pmatrix} b \\ b_1 \\ b_2 \\ \cdot \\ \cdot \\ \cdot \\ b_n \end{pmatrix}$$

ROW CONSTRAINT 70

FIG. 7

PARALLEL LCP SOLVER AND SYSTEM INCORPORATING SAME

This application claims the benefit of provisional U.S. Patent Application No. 60/537,920 filed 22 Jan. 2004.

BACKGROUND OF THE INVENTION

The present invention relates to a method and apparatus for realistically animating the motion and interaction of objects in a display system. More particularly, the present invention relates to a circuit or subsystem having a parallel computational architecture and a method for using same within a system. The parallel hardware architecture allows real-time resolution of complex physics-based data problems, such as Linear Complementarity Problems (LCPs). Such problems arise, for example, during operation of a rigid body dynamics engine within a system having a visual display. The present invention finds application within systems such as a conventional Personal Computers (PCs) and game consoles, as well as recently proposed systems incorporating a hardware-based, physics processing unit.

Physics-based "animations" and "simulations" (hereafter these terms are used interchangeably regardless of application, specific method of display, or means of communicating related physics-based data) have been extensively investigated during the past three decades. Such animations are useful in a range of applications including virtual reality, electronic/computer games, scientific simulations, and robotic motion planning. Game developers, for example, increasingly use real-time, physics-based animations to enhance the realism of game object interactivity. Integral to the development of real-time, physics-based animations is the dynamic simulation of rigid body movements and interactions.

The term "rigid body" is used to describe animated objects that do not deform. They are said to be stiff even when colliding with other objects or with the environment defined by the animation. A rigid body simulation involves a complex sequence of computational steps causing animated bodies and related forces to interact in a realistic manner according to a set of defined physical rules, or so-called "constraints." One goal of a rigid body simulator is to minimize or prevent the penetration of objects. If a simulator were to allow large penetrations of objects, then the illusion of object rigidity would be lost.

The practical development of physics-based animations, including rigid body simulations, has proved quite difficult. For simple cases, continuous real life problems can be written using continuous mathematics and solved algebraically. This approach is to high school physics students. However, the set of cases which have algebraic solutions is very small and a rigid body simulator must be able to handle any configuration of contacting rigid bodies. For this reason, a discrete problem is chosen that approximates the continuous problem. A discrete problem can be represented with a finite amount of data and can be evaluated numerically (by a computer) at discrete time intervals. Given that frames of animation are only required at discrete time intervals, this is an acceptable limitation.

Selecting a discrete model that approximates a sufficiently large class of continuous problems and is solvable in real time by a computer is difficult. A poor choice of discrete model can result in behavior that diverges unacceptably from the original continuous problem. For example with a bad model, objects might jump around for no reason, penetrate unacceptably, fall through a floor, or fly off into infinity.

At least in the context of computer games, the accuracy of discrete approximations with respect to the continuous problem is not particularly important, within certain limits. This result arises because unlike simulations used in science and engineering, computer game animations need not be predictive. Any plausible discrete model will do. However, although this relaxed requirement makes it easier to meet the real-time constraint, it unfortunately doesn't make the mathematics any easier.

Numerous issues must be addressed when building a system adapted to run real-time, physics-based animations. For example, the geometry of objects plays an important role in determining the physics of motion, as well as the physics of contact between objects. An object may be a single rigid body such as a chair or house, or may consist of a number of connected (e.g., jointed) bodies, such as a human figure. Collision or contact between objects must be accurately determined. Solving the necessary equations of motion to realistically animate objects has proved to be a difficult problem since accuracy (i.e., realism) and computational speed are always at odds.

In addition to preventing object/object or object/environment penetration, a system visually displaying the dynamic movement and interaction of rigid bodies must take into account various physical properties of the objects. Mass is one example of a physical property. Physics-based animations must also faithfully track and account for forces upon the animated objects. Gravity is one example of a force. A rigid body simulator, or "engine," associated with the display system must also create the illusion that simulated objects have certain surface properties, such as friction.

As one might expect, the modeling and simulation of the complexities arising from varied object geometries, interacting objects and forces, and changing object constraints requires a great deal of sophisticated mathematics. However, the mathematics implicated in the present invention are conventional in their general nature. That is, those of ordinary skill in the art will understand the mathematical bases upon which the present invention is predicated. It is neither appropriate nor required that this present description teach the entire body of implicated mathematics. Nevertheless, some discussion of mathematical model(s) is required in order to establish a common descriptive vocabulary.

The conventional resources typically available in a display system implementing physics-based animations are conceptually illustrated in FIG. 1. Those of ordinary skill in the art will recognize that the hardware/software designations in this example are relatively arbitrary. For example, computational logic may be fully implemented in software, hardwired, or some combination of software and hardware according to a system designer's discretion. However, some logical distinction between hardware and software as exemplified by current best practices is useful in the description that follows.

In FIG. 1, a Central Processing Unit (CPU) 1, such as a Pentium® microprocessor, together with its associated drivers and internal memory, access data from an associated external main memory 2, and/or one or more peripheral devices 3, typically including a display. The terms "internal" and "external" are used to generally differentiate between various memories in relation to the other computational components in a system. Such differentiation is clearly relative, since most internal memory can be turned into external memory and vice verses. Generally speaking, however, an internal memory is typically co-located on the same integrated circuit (IC) chip as related computational component(s), while external memory is typically implemented on a separate chip or chip set.

A main application 4 is resident in main memory 2 and/or peripheral 3 (e.g., a magnetic or optical disk, a solid-state memory device such as a PROM, EPROM, or EEPROM, a cartridge for a game console or similar device). Main program 4 typically uses one or more Application Programming Interfaces (APIs) to access blocks of specialty software associated with various program functions. An API is a well understood programming technique used to establish a lexicon of sorts by which one piece of software may "call" another piece of software. The term "call" as variously used hereafter broadly describes any interaction by which one piece of software causes the retrieval, storage, indexing, update, execution, etc., of another piece of software.

Data instructions, often in a prescribed packet form and referred to hereafter as "commands," are generally used to initiate calls between one or more software or hardware components. Execution (i.e., "running") of software, in any of its various forms including micro-code, occurs upon receipt of an appropriate command.

Conventional systems implementing physic-based animations routinely include or incorporate by functional "call" a related piece(s) of specialty software referred to generically hereafter as a "physics engine." A physics engine may be thought of as an operative collection of resources, including specialized software, implementing physics effects within a main application.

With the recent and growing appetite for realism, physics engines have been added to the program code implementing, for example, PC games. Indeed, a market has emerged directed to the development physics engines or so-called "physics middleware." Companies like HAVOK, MathEngine, Criterion, and Meqon Research have developed specialty software that may be called by a main application to better incorporate natural looking, physics-based interactions into a main application.

Prior to the use of physics engines in games, objects were animated by hand. These animations were triggered in response to input from the user. For example, if the user pressed a punch key, the game would play a corresponding punch animation. If the user pressed the punch key while standing next to a pile of boxes, then an animation of the pile of boxes falling over might have been played. If the user pressed the punch key while standing next to a game character, an animation of that character falling to the floor might have been played.

Since the animated motion displayed by the game was specified by a set of pre-drawn animations, the punch, the falling boxes, and the falling character would each move in the same manner every time. As well as being quite boring for the user, the animation could not take into account the context of the action. For example, if the user pressed the punch key next to a wall, there would often be nothing to stop the player's arm going through the wall. If the user had previously parked a car behind the pile of boxes, the boxes would typically fall through the car. If the user punched a character next to a cliff, the punched character would typically fall flat and lie in midair over the cliff rather than falling over the cliff ledge.

These problems were overcome conventionally by limiting the user's actions, for example by not giving the user a car to drive, not allowing the user to walk within arm's length of a wall and not allowing fights next to cliffs. These restrictions were often frustrating to the user. Another way around the problem was to simply generate outcome animations for every possible combination of user actions. However, as the number of possible user actions grows, the number of outcome animations outcomes also grows. Thus, as game complexity increases the cost associated with the development of multiple animations becomes prohibitive.

Games designed using only pre-drawn animations start with a completely restricted environment where nothing unscripted can happen. This completely restricted environment is gradually made more interactive as an animator produces more and more animations. In contrast, games designed using physics-based approaches start from the opposite point of view, namely objects initially have complete freedom of motion. The game designer then, for example, designs a solid environment and adds a constraint that objects can still move with complete freedom, except that they must not fall through the solid environment. In a physics-based game, there is no reason why the user can't be given a car, or be allowed to punch a person next to a cliff, so those constraints are never introduced. As the game design progresses, some additional constraints are added, however, as most fun games have some set of defining rules.

Rather than supplying a set of animations for each object, the game designer specifies a set of physical properties for the object such as mass, friction, and in some cases even elasticity. The physics engine then uses the laws of physics to move the objects as if they had these properties, so long as the movement don't violate a specified constraint. A game designer incorporates physics-based effects by deciding what forces and torques to apply to object(s) in response to user input.

Of necessity, physics engines include a rigid body dynamics engine adapted to calculate the movement of rigid bodies within an animation. As will be appreciated by those of ordinary skill in the art, a rigid body dynamics engine will typically form one aspect of a larger physics engine. The exact programming and/or resource boundaries between the rigid body dynamics engine and other effects engines within the physics engine are a matter of design choice, and it is expected that the rigid body dynamics engine will draw upon a library of functions and/or a pool of common resources provided by the physics engine and/or by the main application.

Unfortunately, contemporary physics engines have significant limitations as to the number of objects in an animated scene, and more particularly, the number of active (i.e., moving or interacting) objects. Realistic visual images of physics-based interaction must account for constraints placed upon many or all of the objects. As noted above, a constraint is a restriction on the possible movement or interaction of an object (e.g., a door hinge, a knee joint, a dog on a leash). Increasing complexity of terrain geometry greatly increases the difficulty of simulating object interactions with the terrain. The complexity of collision detection and resolution also increases with the complexity of an object's surface geometry (i.e., its surface detail).

Along with an increasing number of active objects, cutting edge animations and simulations demand an increased number of forces being applied to the objects. These aggregate demands are further aggravated by the increasing number of "time steps" per second being used in animations (i.e., the frequency with which the animated world with all its objects and forces is updated in real time).

However, among the factors challenging the realistic, real-time animation of objects in a physics-based application, the definition and incorporation of constraints upon the animated rigid body objects has proved most difficult. Indeed, it the existence of numerous constraints that makes the underlying mathematical (numerical analysis) problem much more difficult to resolve, as compared with a simple application of Newton's laws of motion. In mathematical terms, it is constraints upon the movement of objects within a physics-base problem that gives rise to many of the difficulties associated with solving the LCPs expressing the physics-based problem.

Many attempts have been made to address the difficulty task of resolving complex bounded value problems, such as LCPs, in an accurate efficient manner. To date, however, these attempts have proved so slow that only relatively small physics-based problems have been successfully animated in real-time. Once the number of the objects, forces, and/or constraints upon objects in a physics-based animation rises above a relatively small value, the mathematics underlying the animation simply can not be resolved in real-time using conventional computational methods and/or conventional hardware platforms. The term "real-time" describes the quality of a visual display having a frame rate sufficiently fast to give a viewer the illusion of continuous, realistic-appearing movement.

As is also well understood by those of ordinary skill in the art, the mathematical resolution of LCPs in a digital computational environment, such as a PC, involve the execution of a numerous floating point operations. While general purpose processors, like the Pentium family of microprocessors, are capable of executing floating point operations, they are not able capable of executing the great number of floating operations typically required for the real-time animation of physics-based interactions.

Simply stated, the well-recognized and growing desire for real-time physics-based animations within next-generation applications remains unmet. This failure is really two-fold. First, conventional computational methods are too inefficient to solve complex LCPs in real-time. Second, conventional hardware platforms do not enable a the speed of data transfer and the number of mathematical operations required to animate complex physics-based interactions in real-time.

SUMMARY OF THE INVENTION

The present invention succeeds where all previous attempts have failed to accurately animate the physics-based interaction of objects in real-time. More particularly, the present invention provides a hardware architecture characterized by the presence of a plurality of execution units arranged in parallel. This architecture enables the rapid transfer of data and the numerous computational operations required to implement real-time, physics-based animations. The parallel hardware architecture described in the present invention is well suited to run projected iterative descent methods. Such computational methods are well adapted to resolve complex LCPs.

Thus, in one aspect the present invention provides a Linear Complementarity Problem (LCP) solver comprising a plurality of circuits or subsystems generally termed Island Processing Engines (IPEs). Each IPE receives and resolves an island data set using a plurality of execution units arranged in parallel. Each execution unit, preferably a vector processor capable of performing floating point operations, resolves a data portion derived from the island data set.

In another aspect, the present invention provides a system executing a main application and comprising a Central Processing Unit (CPU), a main memory, and one or more peripherals including a display. The main memory stores an initial data set related to a physics-based problem arising from execution of the main application. The system further comprises a parallel LCP solver executing a projected iterative descent method. This method is applied to one or more LCPs derived from the initial data set and is implemented using a plurality of execution units arranged in parallel.

In yet another aspect, the present invention provides system of similar composition and function, but further comprising a Physics Processing Unit (PPU). The PPU is preferably a separate co-processor operating in conjunction with the CPU. It comprises a PPU memory receiving and storing at least a portion of the initial data set including a plurality of island data sets. Generally, each island data set corresponds to a rigid body island defined within the initial data set.

The PPU also comprises a LCP solver executing a computational method adapted to resolve a plurality of LCPs, where the LCPs are derived from a corresponding island data set. The LCP solver is characterized by a plurality of execution units resolving the plurality of LCPs in parallel.

Some variations of the PPU include a PPU Control Engine (PCE) controlling overall operation of the PPU, and a Data Movement Engine (DME) controlling the transfer of data between the main memory and PPU memory, as well as the transfer of data between the PPU memory and respective execution units.

The PPU typically communicates data with the CPU and/or main memory via a data transfer protocol such as those defined by USB, USB2, Firewire, PCI, PCI-X, PCI-Express, and Ethernet. In one example, the PPU may be implemented on a PCI expansion board and connected within the system via a PCI expansion slot.

In still another aspect, the present invention provides a LCP solver implementing (i.e., running) a projected iterative descent method adapted to resolve an LCP. The LCP solver comprises a memory storing a data set related to a physics-based problem, where the data set comprises an LCP that defines a whole gradient vector. The LCP solver also comprises a plurality of execution units arranged in parallel. With this arrangement, each execution unit is able to resolve a corresponding subspace of the whole gradient vector in parallel.

The LCP solver preferably comprises a logic circuit defining the plurality of subspaces and transferring each one of the subspaces to a corresponding one of the plurality of execution units. Thus, each subspace is resolved within its corresponding execution unit, such that the whole gradient vector is resolved by parallel resolution of the plurality of subspaces.

BRIEF DESCRIPTION OF THE DRAWINGS

In the drawings, like reference characters indicate like elements. The drawings, taken together with the foregoing discussion, the detailed description that follows, and the claims, describe one or more preferred embodiment(s) of the present invention. In the drawings:

FIG. 7 conceptually illustrates (in part) the formation of a constraint row; and, FIG. 8 is flowchart illustrating an exemplary computational method susceptible to execution on the parallel LCP solver of the present invention.

DETAILED DESCRIPTION OF THE PREFERRED EMBODIMENT(S)

Figure 1:
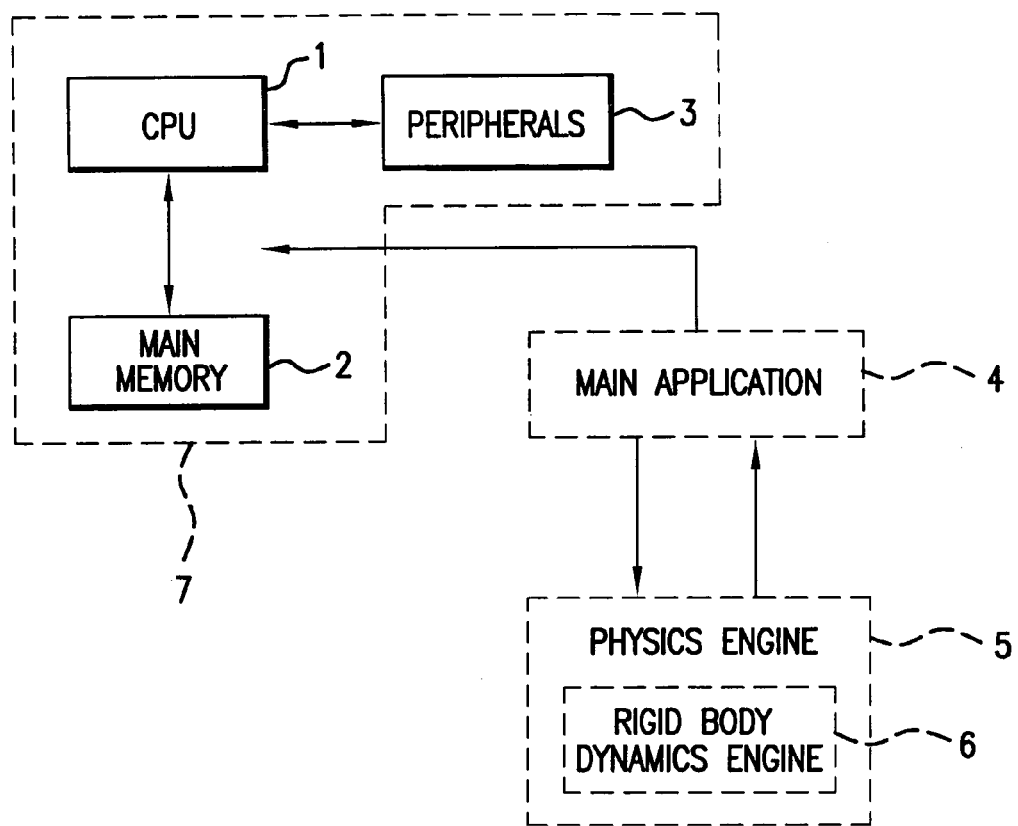
FIG. 1 is a conceptual illustration of a conventional system capable of running a computational method in accordance with the present invention.

In a first embodiment, the present invention is described in the context of a hardware architecture designed to efficiently run a computational method adapted to resolve LCPs using a plurality of parallel execution units. The term "run" (or "running") refers to any hardware/software interaction, whereby one or more logic steps identified by the software are executed using the hardware. Any operative combination of hardware elements, comprising at least the plurality of parallel execution units, that enables execution of a competent computational method resolving LCPs will hereafter be referred to as a "parallel LCP solver."

The parallel LCP solver of the present invention may take many physical forms, including, as examples, a stand-alone circuit, a circuit integrated with a general processor, a single integrated circuit (IC) chip, a set of IC chips, or a subsystem of a dedicated processor implemented on a PCI expansion board. Any one of a number of computational methods may be run on the parallel LCP solver proposed by the present invention. Indeed, certain conventional computational methods may be adapted to efficiently run on hardware designed in accordance with the present invention.

However, as presently preferred, the parallel LCP solver will run a computational method such as the one described in commonly assigned and concurrently filed U.S. patent application Ser. No. 10/793,899. This application, the subject matter of which is hereby incorporated by reference, describes a novel computational method (hereafter, the "improved method") adapted to resolve complex LCPs without the disabilities associated with conventional computational methods. The improved method is described in the referenced application in the context of a projected iterative descent, namely a projected Gauss-Seidel method. A brief background discussion of this improved method will further illuminate the written description of the present invention that follows, and facilitate an understanding of the first embodiment.

The improved method is characterized in one aspect by the definition and use of data forms providing efficient resolution of LCPs derived from physics-based problems. Such physics-based problems necessarily arise when a display system such as a Personal Computer (PC) seeks to incorporate realistic physical qualities into a displayed animation or simulation. LCPs are a common way of mathematically expressing these physics-based problems, but there a variations in the type and quality of data forms used within the LCPS. Properly selected data forms are easier to store and transfer between the logic units executing operations associated with a computational method running on the parallel LCP solver.

In a related aspect, the improved method is also characterized by the use of simplified computational operations. Conventional computational methods often require large matrix/vector multiplication operations. The improved method replaces such complex operations with more efficient ones, such as scaled vector additions. By reducing transactional overhead in the storage and transfer of data and by simplifying computational operations, the improved method is able to run in real-time while providing accurate resolution of LCPs.

The concept of "parallelism" is integral to the present invention. By running a competent computational method on a hardware platform having efficiently laid-out, parallel execution units, the present invention affords significant performance advantages over systems running the same computational method in a largely sequential manner, as is typical with conventional general processors.

While it is possible to modify existing general processors, such as the CPU shown in the exemplary system of FIG. 1, in accordance with the present invention, it is much more likely that the parallel architecture contemplated by the present invention will be provided through the use of a separate co-processor designed to work in conjunction with a general processor. Commonly assigned and pending U.S. patent application Ser. No. 10/715,440 filed Nov. 19, 2003 describes a system incorporating a dedicated Physics Processing Unit (PPU). The subject matter of the application is hereby incorporated by reference.

Figure 2:
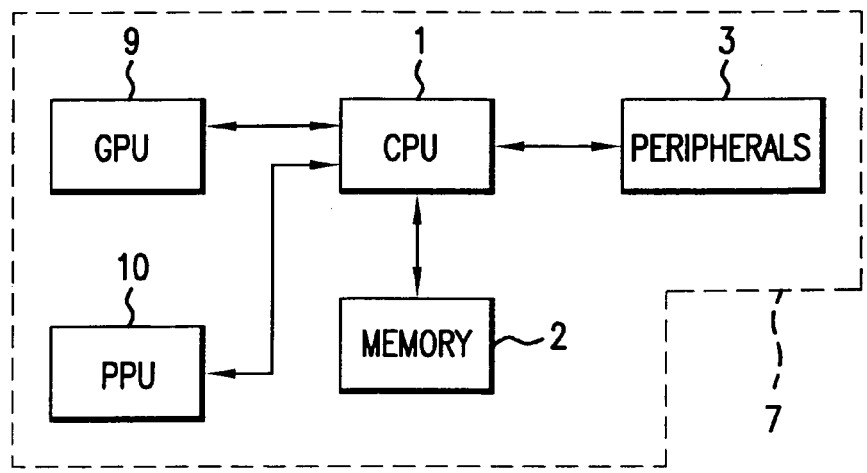
FIG. 2 is a conceptual illustration of a system incorporating a PPU.

FIG. 2 is a conceptual illustration of a system incorporating a PPU 10. The system otherwise comprises a general processor, denoted as a Central Processing Unit (CPU) 1, an external memory 2, and one or more peripherals 3, including a display device. A Graphics Processing Unit (GPU) 9 is also routinely associated with the system.

Figure 3:
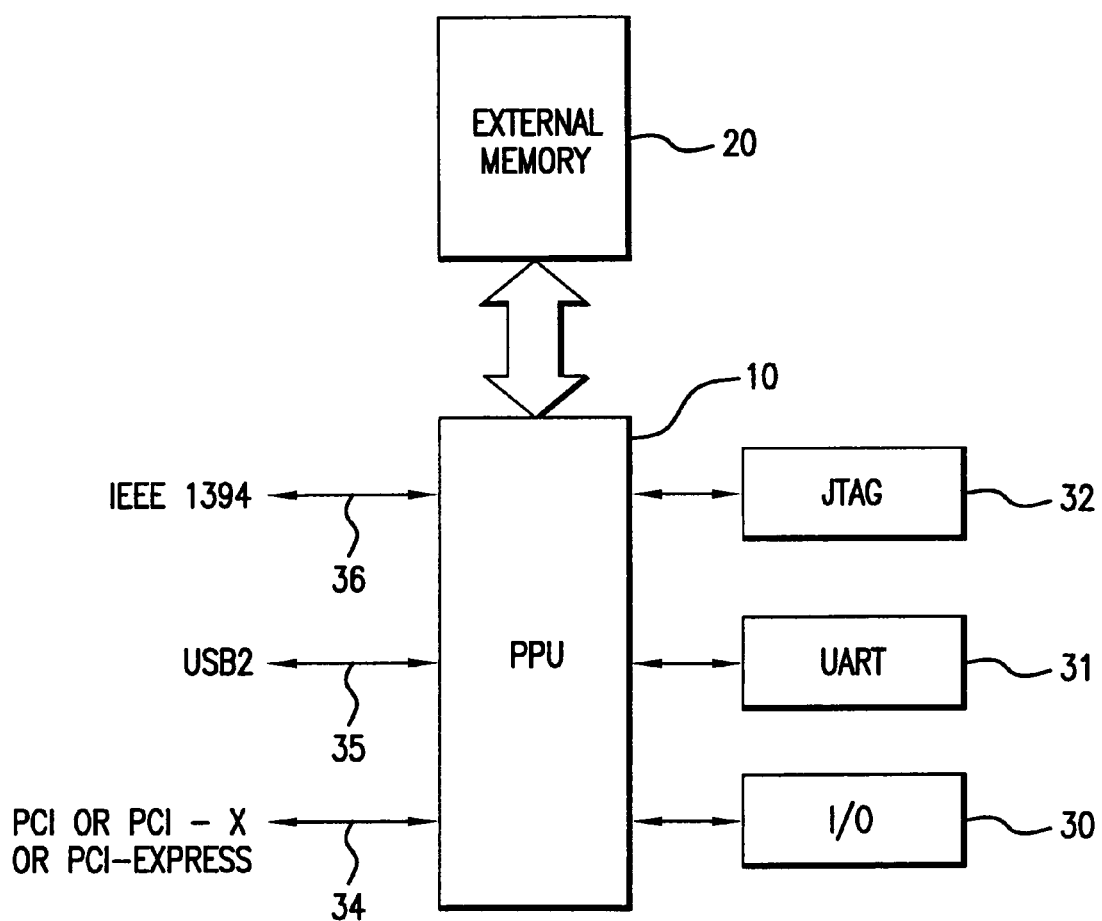
FIG. 3 is a block level diagram showing exemplary connections with and related components to the PPU of FIG. 2.

Exemplary interconnections to PPU 10 are shown in further detail in FIG. 3. Here, PPU 10 is connected to a dedicated external memory 20. Dedicated external memory 20 is preferred since the conventional memory 2 normally associated with CPU 1 is not configured to provide the data bandwidth and data throughput presently contemplated by the architecture of a system incorporating PPU 10. However, PPU 10 need not be universally configured with its own dedicated, external memory 20. It is very possible that PPU 10 might share an external memory with GPU 9 and/or CPU 1.

Returning to FIG. 3, connections between PPU 10 and the other components in system 7, including CPU 1, comprise, for example, a USB2 connection 35, a IEEE 1394 (Firewire) connection 36, and/or one or more of several PCI Interfaces 34, including as examples, PCI, PCI-X, and/or PCI-Express. As presently contemplated, PPU 10 also includes an asynchronous serial interface 31 which allows debugging over an RS-232 link, additional general purpose I/Os 30 provided for low level debugging and status reporting, and/or an IEEE 1149.1 (JTAG) interface 32 provided for the debugging of software running on the PPU 10.

Physical incorporation of PPU 10 within system 7 may be accomplished using one of several approaches. First, PPU 10 may be incorporated using a standard PC Interface (PCI) card where system 7 is a PC, game console, or similar device having PCI expansion slots. Alternatively, a PCI-Express Interface card might be used. A USB2 or Firewire connection to an externally packaged PPU module might be used instead of an internally configured interface card. It is readily foreseeable that a PPU and a GPU will be combined on a single interface card. That is, both chips will be physically mounted on the same card (AGP or PCI-Express), but not directly interfaced with one another. Ultimately, a single interface card having a directly interfaced PPU-GPU combination is expected, but such a combination is probably a generation away. So too is a combination within a single chip of PPU and CPU functionalities.

Parallel execution of the presently preferred computational method poses some significant implementation challenges. The improved method is iterative in nature, i.e., sequentially computing on a working constraint row by working constraint row basis, where each working constraint row computation is predicated upon previously computed constraint row values. In other words, the projected, iterative descent method presently preferred requires the use of previously computed results as soon as they are available. Consider the following example, where an LCP is defined in terms of a system matrix A:

Step 0—Initialization: Define $f^O$ to be an arbitrary vector that lies within a feasible region defined between limits lo and hi, (lo<$f^0$<hi), as an initial candidate solution $f^0$ for an initial iteration;

Step 1—General Iteration: Solve the LCP (b+$Cf^X$,A) by defining a subsequent candidate solution $f^{X+1}$ for an iteration X+1, such that the subsequent candidate solution $f^{X+1}$ is always closer to a final solution for the LCP than a previous candidate solution $f^X$, for all $f^X$ greater than zero; and, Step 2—Test for Termination: Determine whether $f^{X+1}$ satisfies a prescribed stopping rule, and if "Yes" terminate, but if "No" return to step 1 for another iteration, i.e., X→X+1.

Different choices of the matrix splitting (B,C), where system matrix A=B+C, determine the particular computational method best suited to solve LCP(b,A). For example, a projected, iterative Gauss-Seidel method is preferred where splitting B is selected such that B=L+D, and where L and D are, respectively, the strictly lower triangular and diagonal parts of system matrix A, and the components of the iterate vector $f^{X+1}$, i.e., the candidate solution for a given iteration i, are given recursively by, $$f_i^{X+1} = \max\left(0, f_1^X - a_{ii}^{-1}\left(b + \sum_{j<i} a_{ij} f_j^{X+1} + \sum_{j\geq i} a_{ij} f_j^X\right)\right), i = 1, \ldots, m. \quad (1)$$

In order to compute $f_i^{X+1}$ in equation (1) for a working constraint row i, all previously computed results $f_j^{X+1}$, where j<i will be used immediately instead of using $f_j^X$, as computed for all constraint rows j<i from the loop associated with time step increment x. This computational necessity would seem to prohibit the use of a hardware platform characterized by parallel execution units. However, a more careful observation of the improved method reveals that $f_i^{X+1}$ does not depend on $f_j^{X+1}$ as computed for all constraint rows j<i where a properly selected "coupling invariant" is used to define an "auxiliary variable" v. Therefore, as long as $f_j^{X+1}$, for j<i, isn't coupled with $f_i^{X+1}$ through the coupling invariant defining the auxiliary variable v, then $f_i^{X+1}$ can be calculated independent from $f_j^{X+1}$ as computed for all constraint rows j<i. This computationally independent relationship allows for parallel execution.

This relationship may be expressed in mathematically terms as:

$$\{v_{I(i,1)}, v_{I(i,2)}\} \cap \{v_{I(j,1)}, v_{I(j,2)}\} = \Phi \quad (2).$$

Stated more literally, there is no intersection between a set of auxiliary variables, $\{v_{I(i,1)}, v_{I(i,2)}\}$, defined in accordance with a selected coupling invariant for a working constraint row i and a corresponding set of auxiliary variables, $\{v_{I(j,1)}, v_{I(j,2)}\}$, for a previously considered constraint row j. That is, no common or shared elements exist for $\{v_{I(i,1)}, v_{I(i,2)}\}$ and $\{v_{I(j,1)}, v_{I(j,2)}\}$. If equation (2) is expressed alternatively as {I(i,1), I(i,2)}∩{I(j,1), I(j,2)}=Φ, a more intuitive physical meaning may be discerned, namely constraint row i and constraint row j are related to different object pairs.

Two important observations arise in relation to the parallel execution of a projected iterative descent method in accordance with this exemplary embodiment of the present invention. First, for any two constraint rows i≠j, $f_i^{X+1}$ and $f_j^{X+1}$ are calculated independently, as long as {I(i,1), I(i,2)}∩{I(j,1), I(j,2)}=Φ. Second, to maintain convergence of the projected iterative descent method, the most current values for $\{v_{I(i,1)}, v_{I(i,2)}\}$ should be used to calculate $f_i^{X+1}$.

Of note here, the sequence of constraints influencing an island (i.e., a grouping) of objects (e.g., rigid bodies) is typically generated in a random manner by conventional collision detection routines. Collision detection is a common precursor step to the resolution of rigid body dynamics. Thus, a random order appearance (and subsequent random resolution) of constraints defining the LCP should not have a negative influence on convergence.

The term "rigid body island" is used hereafter to refer to any set of rigid bodies directly or indirectly connected one to another by one or more constraints. The resulting collection of object-related data and constraint-related data is referred to as an "island data set." The dynamics of an individual rigid body island may be resolved using a separate LCP. In other words, an island data set defines a whole gradient vector expressed by the LCP. As will be seen hereafter, the island data set (whole gradient vector) will divided into multiple subspaces for resolution by the parallel hardware architecture of the present invention.

Figure 4:
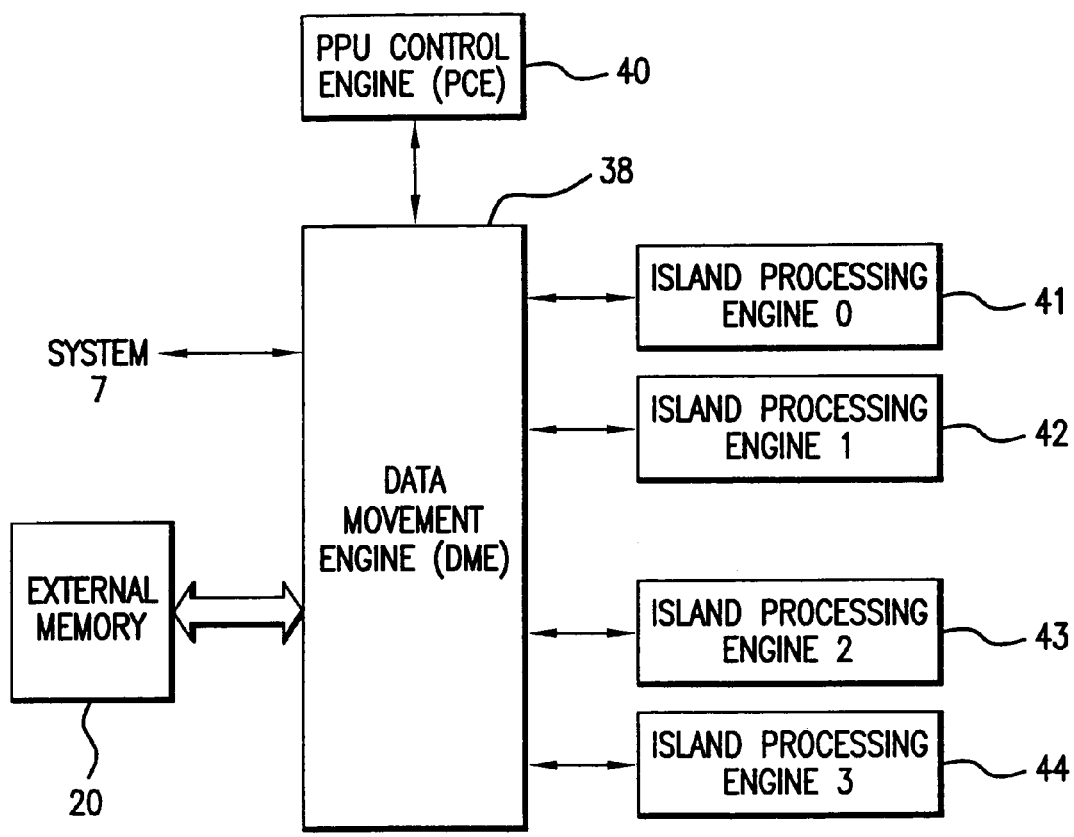
FIG. 4 is a block level diagram illustrating the implementation of an exemplary parallel LCP solver within the context of the PPU shown in FIG. 2.

Recognizing the foregoing attributes of the preferred improved method, the problem of efficiently mapping or allocating the computational requirements of the method onto a hardware platform having parallel execution units remains. FIG. 4 is a functional block diagram illustrating an exemplary data transfer and logic control relationship between components within the PPU of FIG. 2. Overall control of PPU 10 may be directed from CPU 1. However, a primary reason PPU 10 is provided within system 7 is to reduce the computational burden placed on CPU 1. Accordingly, as presently preferred, PPU 10 will include a PPU Control Engine (PCE) 40 adapted to control most, if not all, PPU operations. Central to the efficient operation of PPU 10 is Data Movement Engine (DME) 38. In the exemplary embodiment, DME 38 is connected to system 7 and external memory 20. PPU 10 further comprises a plurality of Island Processing Engines (IPE). Each IPE is preferably a vector processor, but may take many other forms in accordance with particular design considerations. In the present example, only four IPEs 41, 42, 43, and 44 are illustrated for the sake of clarity. However, it is presently contemplated that more than four IPEs may be used within PPU 10.

Main application 4 (see, FIG. 1) running on system 7 will generate an initial physics-based data set. This "initial data set" will vary in size and composition according to the exact nature of the physics-based animation to be displayed. However, the initial data set will typically be derived from a body mass array defining the mass and/or moment of inertia for objects in the animation, and a constraint data array defining constraints acting upon the respective objects.

Following definition of an initial data set, the CPU and/or PPU calculates one or more LCP-related data components using conventional techniques. LCP-related data components include, as examples and without limitation, Jacobian(s) related to the initial data; initial forces, if any, acting on the objects; system matrix A, matrix splittings, diagonals, etc. Of note, the preferred improved method does not require explicit calculation and storage of system matrix A. This may not be true for other selected computational methods.

Where such calculations are performed by the CPU, the initial data set is augmented with the calculation results. Once finalized, the initial data set is transferred to the PPU via a competent physical connection by means of a conventional data transfer protocol. Transfer of the initial data set from one or more components in system 7 to PPU 10 may take place as a single block transmission, or as a sequence of related data block transmissions.

After receiving the initial data set, PCE 40 defines one or more island data sets from the initial data set, and thereafter distributes a island data set to each respective IPE. As presently preferred, this is the first moment at which LCP-related data components like the Jacobian are required to construct a LCP from each respective island set. Accordingly, many, if not all, of the LCP-related data components will be calculated in an IPE.

Alternatively, like calculation of one or more of the LCP-related data components, the definition of one or more island data sets may be performed by CPU 1.

Figure 5:
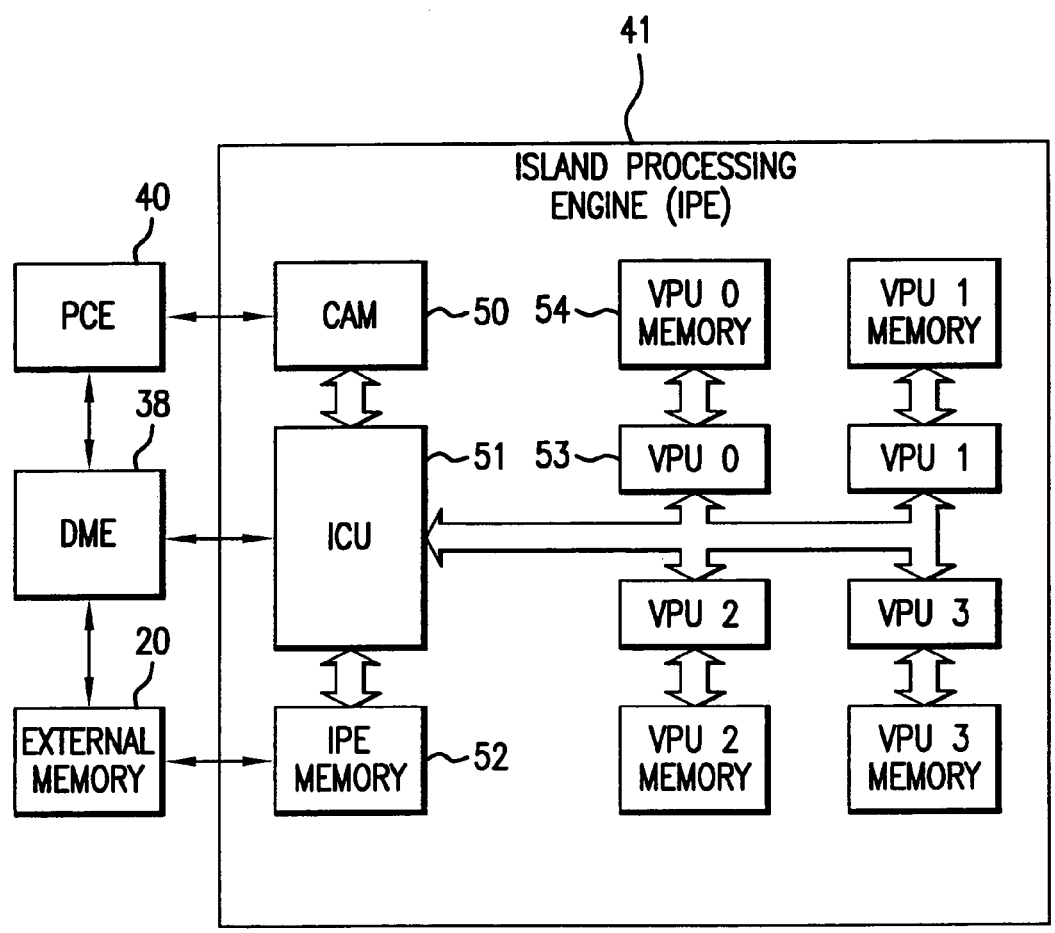
FIG. 5 is a block level diagram further illustrating in one embodiment the parallel LCP solver of the present invention.

The IPE in FIG. 4 is illustrated in some additional detail in FIG. 5. Here, IPE 41 comprises a conventionally constructed Island Control Unit (ICU) 51 communicating at least data transfer commands to/from DME 38, and generally directing the transfer of data between an IPE memory 52 and a plurality of execution units. ICU 51 also directs the transfer of between external memory 20 and IPE memory 52. IPE 41 further comprises in this particular teaching example a Content Addressable Memory (CAM) 50, and a plurality of Vector Processing Units (VPUs), each having an associated VPU memory. As presently preferred, each VPU is formed from a combination of conventional elements including at least one circuit executing floating point operations.

Vector-type processors are presently preferred for the execution of mathematical operations, such as floating point operations, within an IPE. However, the parallel-arranged and computationally-related circuits within each IPE need not be vector type processors, and are generically referred to hereafter as a "plurality of execution units." In general, each execution unit in the plurality of execution units will receive some portion of data from the island data set and resolve said "data portion" in parallel with the other execution units.

In the example shown in FIG. 5, a single execution unit, VPU 53 and its associated VPU memory 54, are numerically identified. The choice of four VPUs in the current example is merely illustrative. As presently preferred, the plurality of execution units provided by the plurality of IPEs will perform a great majority of the mathematical computations inherent in the resolution of physics-based animations. Accordingly, PCE 40, and the associated plurality of ICUs do not need to provide a great deal of computational power.

Use of CAM 50 illustrates one presently preferred scheme by which successful parallel execution of a LCP computational method is accomplished. In this regard, CAM 50 is a conventional circuit that functions as a type of specialized memory. ICU 51 logically controls and arbitrates the distribution of constraint rows from IPE memory 52 to a selected one of the plurality of executions units in accordance with data stored in CAM 50. That is, an island data set is transferred to IPE memory 52 from external memory 20 or directly from system 7. The island data set comprises a large collection of constraint rows defining the rigid body island. By careful utilization of CAM 50, data corresponding to a selected group of constraint rows is transferred from IPE memory 52 to a selected execution unit memory, e.g., VPU memory 54. Thereafter, the grouping or "subspace" of constraint rows is resolved in the corresponding execution unit.

Appropriate constraint row distribution by ICU 51 in conjunction with CAM 50 ensures that for any two constraint rows $i \neq j$, $f_i^{X+1}$ and $f_j^{X+1}$ are calculated simultaneously if they satisfy the relationship $\{I(i,1), I(i,2)\} \cap \{I(j,1), I(j,2)\} \equiv \Phi$, subject to certain exceptions explained hereafter. For ease of reference, this relationship will be referred to hereafter as "the first parallelization condition." Additionally, "a second parallelization condition" is also imposed, namely the most current values for $\{v_{I(i,1)}, v_{I(i,2)}\}$ are used to calculate each $f_i^{X+1}$.

The inter-operation of ICU 51, CAM 50 and respective execution units is further illustrated in relation to the exemplary computational method illustrated in Pseudo-code example 1 below.

Pseudo-Code Example 1

```
Initialize: f, v, x = 0, 0, 0 and new_v_tag = 1
while (1)
    i = 0
    max_u = 0
    cur_v_tag = new_v_tag          // Remember tags from last (i.e. previous) time step
    new_v_tag = 0                  // Clear tags for current time step
        do i ≠ m
            if !(cur_v_tag[I(i,1)] || cur_v_tag[I(i,2)])    // If both the two objects have
                continue to next i=i+1                       small changes, skip this row
            end if
            u_i = b_i + J_Qi1^C · v_I(i,1) + J_Qi2^C · v_I(i,2)
            newf := med(lo_i, f_i − a_ii^−1 * u_i, hi_i)
            Δv = (newf − f_i)(J_Qi1^C)^T
                if ||Δv||_∞ > Thres           // Check if object I(i,1)'s v has big change?
                    new_v_tag[I(i,1)] = 1
                end if
            v_I(i,1) := v_I(i,1) + Δv
            Δv = (newf − f_i)(J_Qi2^C)^T
                if ||Δv||_∞ > Thres           // Check if object I(i,2)'s v has big change?
                    new_v_tag[I(i,2)] = 1
                end if
            v_I(i,2) := v_I(i,2) + Δv
            f_i := newf
                                              // Check the LCP boxing conditions
            if(f_i = lo_i ∧ u_i < 0) ∨ (f_i = hi_i ∧ u_i > 0) ∨ ((f_i < hi_i) ∧ (f_i > lo_i) ∧ (|u_i| > Thres))
                if (|u_i| > max_u)            // If boxing conditions not satisfied, check max |u_i|
                    max_u = |u_i|
                end if
                                              // Despite not satisfying conditions, calculate the row in next time step
            new_v_tag[I(i,1)] = 1
```

-continued

```
    new_v_tag[I(i,2)] = 1
    end if
  end do
  if (max_u < Thres)        // If max_u is less than threshold, method converges
      break /* algorithm ends */
  endif
end while
```

In the context of this exemplary computational method, an index of data entries controlled by CAM 50 is defined in accordance with an unique object identifier (ID) attached to each object in the initial data set. As shown in Table 1, an exemplary data entry in CAM 50 is presently defined by one byte of data in which bits 7 and 8 indicate an associated execution unit (VPU), bit 5 is the "cur_v tag" value, bit 4 is the "new_v_tag" value, and bits 3, 2, 1, and 0 are used to indicate the number of constraints (joints and/or contacts) that yet require the use of an auxiliary variable v associated with the object. This auxiliary variable is denoted $v_{index}$. This approach provides an internal counter of sorts that tracks whether a particular auxiliary variable, now stored in an execution unit's memory, is still required by an execution unit for some ongoing computation, or whether the auxiliary variable is no longer needed and may be transferred back to IPE memory 52 for future use.

To more readily understand the inter-operation of the units comprising exemplary IPE 41 in the assignment of constraint rows between parallel execution units, the working example will be further simplified for purposes of explanation. Simplification is made in three ways. First, an IPE comprising only two parallel execution units is assumed, instead of the four shown in FIG. 5. Second, all constraint are assumed to have only one constraint row. Third, the row filtering function provided in the exemplary computational method above is disabled. That is, "cur_v_tag" is assumed to be "1," and all constraint rows will be processed.

It should be noted at this point that use of CAM 50 to track auxiliary variables and the use of a row filtering technique are independent from one another. Row filtering improves performance by avoiding numerous computational operations that do not contribute significantly during a given iteration to convergence. Row filtering increases the efficiency of a computational method whether it is executed using a single general processor (CPU), or a parallel computational architecture. Where row filtering is used, however, entries to CAM 50 are made for only those rows that survive the row filtering process. Given these simplifying assumptions, operation of CAM 50 will be described with reference to Tables 1 and 2. Table 1 lists several exemplary constraint rows.

Table 2 is a truth table describing all possible processing actions for any given CAM access. Truth table outcomes begin when ICU 52 fetches a working constraint row i, and uses an index function I(i;:) to identify the two objects (1 and 2) associated with working constraint row i, using the respective object IDs. That is, the truth table is accessed using first ("A") and second ("B") indices, respectively defined as A=I(i,1) and B=I(i,2).

TABLE 1

| Constraint row number | The first object ID A = I(i, 1) | The second object ID B = I(i, 2) |
|---|---|---|
| 1 | 2 | 1 |
| 2 | 1 | 3 |
| 3 | 5 | 4 |
| 4 | 5 | 6 |
| 5 | 1 | 4 |

TABLE 2

| (VPU ID, cur_v_tag) | xx1 | xx0 | aa1 | aa0 |
|---|---|---|---|---|
| xx1 | Forward row to least busy VPU; Create CAM entries for A & B | Forward row to least busy VPU; Create CAM entries for A & B | Forward $v_B$ to VPU aa; Create a CAM entry for body B | |
| xx0 | Forward row to least busy VPU; Create CAM entries for A & B | Skip constraint row until next iteration | Forward $v_B$ to VPU aa; Create CAM entry for body B | Skip constraint row until next iteration |
| bb1 | Forward $v_A$ to VPU bb; Create CAM entry for body B | Forward $v_A$ to VPU bb, Create CAM entry for body B | Skip constraint row until next iteration; Try in the same iteration if aa != bb; Otherwise, forward to VPU aa, i.e. bb. | Skip constraint row until next iteration; Try in the same iteration if aa != bb; Otherwise, forward to VPU aa, i.e. bb. |
| bb0 | | Skip constraint row until next iteration | Skip constraint row until next iteration; Try in the same iteration if aa != bb; Otherwise, forward to VPU aa, i.e. bb. | Skip constraint row until next iteration |

Before initial operation, CAM 50 is cleared, and all memory entries are made available for storing an object ID. Thereafter, IPE 41 processes a collection of constraint rows according to a predefined sequence. The following example teaches CAM operation within this process.

Step 1: Constraint row 1 is checked. ICU 52 twice performs a look-up operation in CAM 50 using respectively the two object IDs A="2" and B="1". Obviously, no CAM entries exist at this point following CAM initialization. Thus, according to the description of (xx1, xx1) in Table 2, where "xx" means no CAM entry exists for an object, constraint row 1 is forwarded to VPU 00, since both VPU 00 and VPU 01 are both idle and under such circumstances the first identified execution unit, VPU 0, is nominally selected. Two CAM entries are thereafter allocated—one per object.

A first CAM entry is made for the first object having an ID value of "2." Assuming the preferred, 8-bit CAM entry data structure described above, the first CAM entry looks like this:

| 7 | 6 | 5 | 4 | 3 | 2 | 1 | 0 |
|---|---|---|---|---|---|---|---|
| VPU ID = 00 | | 1 | | Number of constraints using $v_2 = 1$ | | | |

CAM Entry 1

A second CAM for the second object having an ID value of "1" looks like this:

| 7 | 6 | 5 | 4 | 3 | 2 | 1 | 0 |
|---|---|---|---|---|---|---|---|
| VPU ID = 00 | | 1 | | Number of constraints using $v_1 = 1$ | | | |

CAM Entry 2

Since row filtering has been disabled in the current working example, a value of "1" is written for bit 5 in each CAM entry. At this time, the first execution unit, VPU 00, has data corresponding to constraint row 1 stored in its associated memory, and VPU 01 is still idle.

Step 2: Constraint row 2 is checked. Object IDs A="1" and B="3" are obtained. A look-up operation is performed in CAM 50 for A. Since an object having an ID value of "1" is already stored in CAM as entry 2, a value of "00" is returned from bits 7 and 6 in CAM entry 2 and a value of "1" is returned from bit 5 in CAM entry 2. Since the object having an ID of "3" has not yet used, a table index value of "xx1" is used. Accordingly, Table 2 is accessed by index values aa1=001, and xx1. In response, ICU 52 will forward data corresponding to constraint row 2 to the first execution unit VPU 00, and update CAM entry 2 for object "1", since the first execution unit VPU 00, will now use a common auxiliary value $v_1$ in the calculation of constraint rows 1 and 2. Corresponding CAM entries for Step 2 are shown below.

| 7 | 6 | 5 | 4 | 3 | 2 | 1 | 0 |
|---|---|---|---|---|---|---|---|
| VPU ID = 00 | | | | Number of constraints using $v_1 = 2$ | | | |

CAM Entry 2

| 7 | 6 | 5 | 4 | 3 | 2 | 1 | 0 |
|---|---|---|---|---|---|---|---|
| VPU ID = 00 | | | | Number of constraints using $v_3 = 1$ | | | |

CAM Entry 3

With the completion of step 2, VPU 00 has constraint rows 1 and 2 stored in its associated memory. VPU 01 remains idle. Of note, constraint rows 1 and 2 do not satisfy the first parallelization condition, $\{I(i,1), I(i,2)\} \cap \{I(j,1), I(j,2)\} \equiv \Phi$, since they share a common object "1". However, this fact does not contradict the previous conclusion or recommendation regarding conditions placed upon the distribution of constraint rows between a plurality of execution units.

The reasoning behind this apparent exception becomes clear upon further consideration of execution unit functionality. All the constraint rows in VPU memory are processed sequentially. Thus, the so called first parallelization condition noted above does not apply to constraint rows commonly distributed to a VPU. Rather, the first parallelization condition is more properly considered a distribution condition applied to constraint rows stored in different IPEs and/or different VPUs within an IPE. Thus, constraint rows resolved in different execution units should always satisfy the first parallelization condition, $\{I(i,1), I(i,2)\} \cap \{I(j,1), I(j,2)\} \equiv \Phi$, since they are processed in parallel.

In contrast, it is presently preferred that all constraint rows related to a common object be resolved within a single execution unit, wherever possible. Sequential processing of constraint rows within each execution unit also ensures faithful adherence to the second parallelization condition. The strategy of forwarding, wherever practical, a particular constraint row to an execution unit processing other constraint rows associated with a common object(s) will also reduce the amount of data being transferred between the ICU and the respective execution unit. In one sense, when used accordance with the prescribed parallelization conditions, each respective VPU memory forms a cache for auxiliary variable(s).

Step 3: Constraint row 3 is checked. Object IDs of A="5" and B="4" are returned. When performing a look-up operation in the CAM, no CAM entries are found for these two objects. This result in a truth table condition of (xx1, xx1), and constraint row 3 is accordingly distributed to the least busy execution unit, VPU 01. By forwarding constraint rows to a "least busy" execution unit, the data loads distributed to the respective execution units are relatively balanced. Two new CAM entries, 4 and 5, are created as a result of step 3.

| 7 | 6 | 5 | 4 | 3 | 2 | 1 | 0 |
|---|---|---|---|---|---|---|---|
| VPU ID = 01 | | | | Number of constraints using $v_5 = 1$ | | | |

CAM Entry 4

| 7 | 6 | 5 | 4 | 3 | 2 | 1 | 0 |
|---|---|---|---|---|---|---|---|
| VPU ID = 01 | | | | Number of constraints using $v_4 = 1$ | | | |

CAM Entry 5

At this time, VPU 00 stores constraint rows 1 and 2 in its memory, and VPU 01 stores constraint row 3.

Step 4: Constraint row 4 is checked. Object IDs of A="5" and B="6" are returned. When performing a look-up operation in the CAM, the existing CAM entry for the object having an ID "5" is updated, and a new CAM entry is generated for the object having an ID of "6", as shown below.

| 7 | 6 | 5 | 4 | 3 | 2 | 1 | 0 |
|---|---|---|---|---|---|---|---|
| VPU ID = 01 | | | | Number of constraints using $v_5 = 2$ | | | |

CAM Entry 4

-continued

| 7 | 6 | 5 | 4 | 3 | 2 | 1 | 0 |
|---|---|---|---|---|---|---|---|
| VPU ID = 01 | | | | Number of constraints using $v_6 = 1$ | | | |

CAM Entry 6

Data corresponding to constraint row 4 is forwarded to VPU 01, since VPU 01 already contains a constraint row related to object "5". At this time, VPU 00 stores constraint rows 1 and 2 in its memory, and VPU 01 stores constraint rows 3 and 4. Of note, there are no constraint rows stored in VPU 00 and VPU 01 that relate to a common object. Therefore, the first parallelization condition is satisfied.

Step 5: Constraint row 5 is checked. Object IDs of A="1" and B="4" are returned. When performing a look-up operation in the CAM, CAM entries 2 and 5 are identified for objects having these respective IDs. According to the description of (aa1="001", bb1="111") in Table 2, and due to the fact that (aa="00") !=(bb="11"), constraint row 5 is skipped temporarily.

Constraint row 5, the only "skipped" constraint row in the simple working example, is processed in a subsequent iteration after all the constraints rows successfully distributed to execution units have been processed. Once these distributed constraint rows are resolved, it is highly likely that constraint row 5 will be able to be processed without difficulty. Stated in other terms, objects "1" and "4", which are already stored in different execution units by the time the constraint row distribution process reaches constraint row 5, form a competing object pair for constraint row 5. With resolution of stored constraint rows 1 through 4, the corresponding CAM entries will be released, and constraint row 5 will accordingly be susceptible to proper distribution.

As will be seen hereafter, the function of "releasing" objects, and more significantly their corresponding auxiliary variable v, from the CAM is implemented using the "number of constraints using $v_{index}$". This mechanism is one example of a strategy for successfully enforcing the first and second parallelization conditions. Otherwise, in the foregoing example, VPU 00 and VPU 01 would both contain constraint rows associated with one or more common objects.

The process of "releasing" objects from the CAM warrants some additional discussion. As presently contemplated, the respective execution units will begin processing data as soon as constraint row(s) are distributed by inter-operation of the ICU and CAM. As soon as a constraint row is processed, the execution unit notifies the ICU to update the corresponding CAM entries.

Thus, returning to the example above, update of the corresponding CAM entries decreases the "number of constraints using $v_A$" and "number of constraints using $v_B$" by 1, respectively. When a "number of constraints using $v_{index}$" value for a particular CAM entry reaches zero, the corresponding auxiliary variable is not needed (i.e., bound up with) the resolving execution unit. Accordingly, data corresponding to the auxiliary variable may be transferred from the execution unit to the IPE memory for subsequent transfer to another execution unit, as needed.

Thus, a mechanism is provided to ensure proper parallel resolution of constraint rows, while also ensuring resolution of all necessary constraint rows. In the foregoing example, constraint row 5 is readily resolved following resolution of constraint rows 2 and 3.

Of note, the foregoing scheme for the dynamic distribution and release of constraint rows does not require a CAM entry be made for every object in an island data set. The use of a CAM thus reduces overall memory requirements. Inferior alternatives to CAM use include the use of a linear table to assign table entries for all the objects in an island data set.

Figure 6:
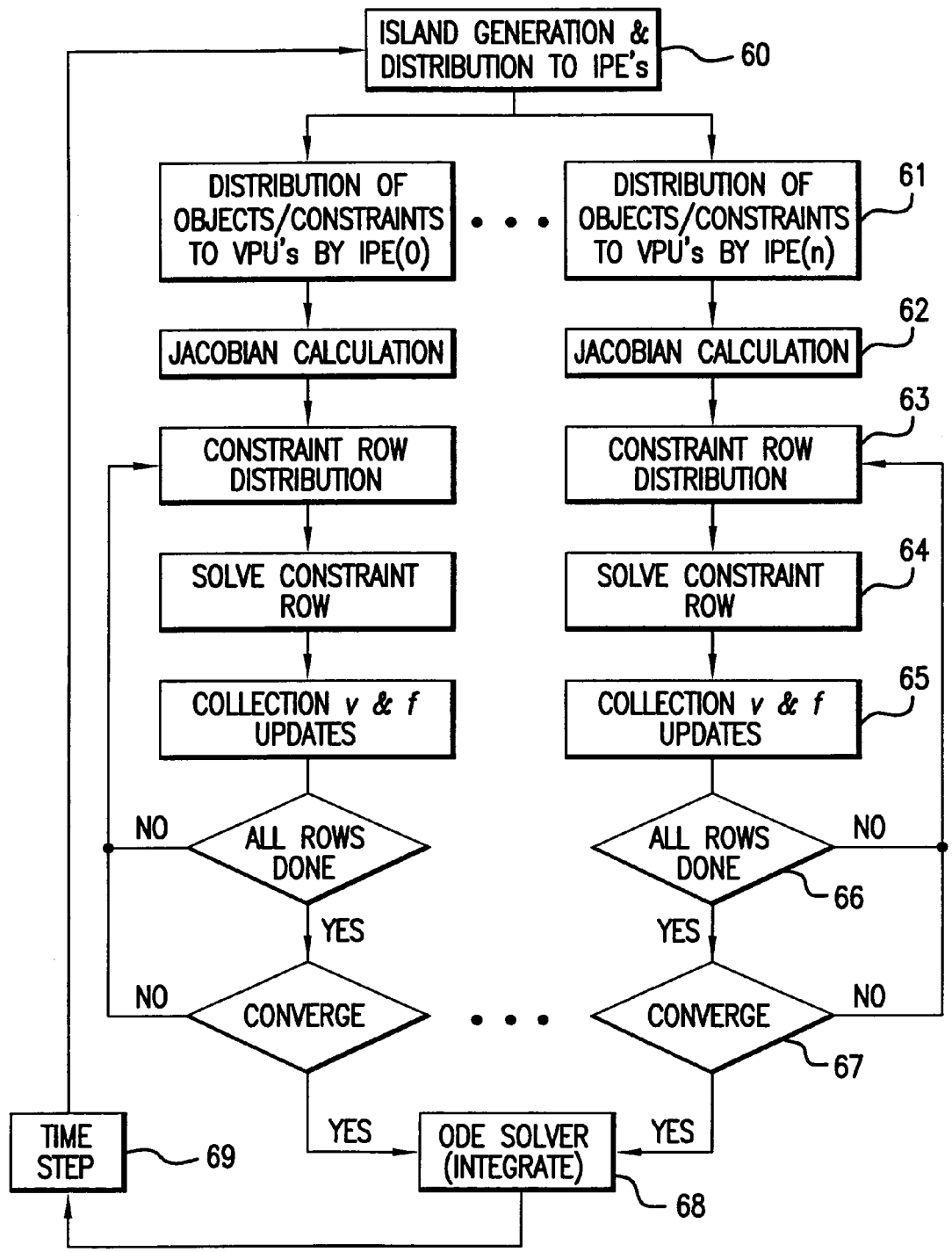
FIG. 6 is a flowchart illustrating an exemplary method of operation for the parallel LCP solver of the present invention.

FIG. 6 is a flowchart illustrating an exemplary method of operation for a parallel LCP solver finding application, for example, in a rigid body dynamics simulator. After defining an initial data set, a system processor (either CPU or PPU) will further define one or more island data sets, where each island data set corresponding to a at least one separate rigid body island. Then, the one or more island data sets are distributed to a plurality of IPEs (60). For each IPE, data corresponding to each object and constraint in the island data set are distributed across a plurality of VPUs (i.e. execution units) (61).

Typically, each VPU will thereafter calculate a corresponding Jacobian for the object or constraint (62). Under the control of the ICU and using CAM indexing described above, constraint rows and associated Jacobians are distributed across the plurality of VPUs (63), and thereafter solved (64). The resulting calculations are changes to the velocities (u) and forces (f) influencing the movement of the objects defined in the island data group. Clearly, other computational approaches may be taken, but the present invention preferably calculates force changes. Strictly speaking, the "force" calculations in the preferred embodiment are not real constraint force(s)/torque(s), but Lagrange multipliers. The real constraint force(s)/torque(s) are determined by the multiplying the calculated change in force "f" by a corresponding Jacobian. Once the constraint force(s)/torque(s) are obtained, an integration process (i.e. an ordinary differential equation ("ODE") calculation) is performed to update the positions, orientations, linear velocities, and angular velocities for objects in an island data set.

As presently preferred, both the constraint force/torque calculation(s) and ODE integration process(es) are performed in parallel in the PPU. This is especially true for the constraint force/torque calculation(s) which are used in the CAM-based constraint row distribution scheme described above.

That is, once the velocity and force vectors are calculated, CAM entries are updated (65). Consistent with the foregoing description, the appropriate values for "number of constraints using $v_{index}$ are decreased, and if zero, the corresponding $v_{index}$ will be read back from the resolving VPU to the IPE memory and the CAM entry will be clearly. The process of distributing (63), and solving (64) constraint rows to yield updated velocities and forces vectors (65) continues until all rows are processed (66=Yes). Thereafter, convergence is tested. Where convergence is found, data is integrated in a conventional Ordinary Differential Equation (ODE) solver (68), as described above. Thereafter, the time step (i.e., LCP solver iteration) in incremented (69), and the animation/simulation continues. Of note, a conventional collision detection step is typically performed before each island generation and distribution step (60).

The present invention is further illustrated in the following alternate embodiment. It begins with the selection of a computational method competent to solve physics-based LCPs, namely a steepest descent method. This method is routinely used to solve linear equations. The steepest descent method essentially finds a vector x that satisfies the base equation $A_{n \times n} \cdot X_{n \times 1} = b_{n \times 1}$ for an n by n system matrix A. The base equation may be expressed as a function:

$$f(x_{n \times 1}) = \frac{1}{2} x_{n \times 1}^T A_{n \times n} x_{n \times 1} - b_{n \times 1}^T x_{n \times 1}.$$

The minimum of this function occurs when its derivative is zero, or $$f'(x_{n \times 1}) = A_{n \times n} x_{n \times 1} b = 0.$$

Thus, if for a selected vector x (i.e., a self-variant x), f(x) reaches a minimum (or its first derivative equals zero), then the selected vector x is a solution to the base equation.

The steepest descent method begins by making an initial guess at the solution vector x, and thereafter iteratively modifying x until f(x) can not be further reduced. At each iteration, the method seeks to move x linearly in a direction that provides the greatest reduction in the value of f(x). The direction of steepest descent may be expressed as $-f'(x_{n \times 1}) = b_{n \times 1} - A_{n \times n} x_{n \times 1}$. Accordingly, for each iteration, x is moved linearly in this direction to a new position expressed as $$x_{n \times 1}^{(k+1)} = x_{n \times 1}^{(k)} - \alpha f'(x_{n \times 1}^k).$$

This process is repeated until $f'(x^k)$ is sufficiently close to zero.

When adapted and applied to a boxed LCP, the steepest descent method is said to be "projected." That is, the method proceeds as above, except following each iteration, the x vector is projected onto constraints. This computational step can be illustrated mathematically by the equation $$x_{n \times 1}^{(k+1)} = \text{mid}(\text{lo}, x_{n \times 1}^{(k)} - \alpha f'(x_{n \times 1}^k), \text{hi}),$$

where the "mid" function selects the median element for each constraint row.

To this point, the selection of a computational method and its projection over a boxed LCP can rightly be deemed conventional in nature. However, such conventional approaches, like the exemplary steepest descent method illustrated above, operate over the whole gradient vector (i.e., the "whole space") defined by the physics-based data set during each computational iteration. Thus, these approaches offer little, if any, opportunity for parallel resolution of the numerous computations required to resolve the boxed LCP.

The whole space may be thought of as a collection of data matrices defined from the physics-based data set. As illustrated in FIG. 7, for only an exemplary group of associated matrices defining the whole space, a row-wise association of data elements forms constraint row 70. Constraint rows influencing a common object are termed "neighbored constraint rows."

The present invention avoids the computational difficulties associated with descending over the whole space by dividing the whole space into selected subspaces. Once selected subspaces have been defined, a competent computational method is applied and descends along each one of the selected subspace. Subspaces are selected at the beginning of each general iteration of the computational method based on the relative change (i.e., steepness) of each subspace during the current iteration. "Greatest relative change" may be determined in many ways, such as by locating the constraint row in the whole space having the highest velocity value, u. By sequentially selecting the "next" subspace to-be-resolved during a particular iteration on the basis of its greatest relative change, the present invention effectively descends along (resolves) the subspace most likely to affect the physics-based animation.

For example, assume an island data set communicated to IPE 41 shown in FIG. 5 that corresponds to a number of objects in an animation, each object having during any given iteration from zero to m constraints affecting it. That is, each object may be affected by zero or more constraints during a particular iteration, where each constraint defines one or more constraint rows within the island data set.

Figure 8:
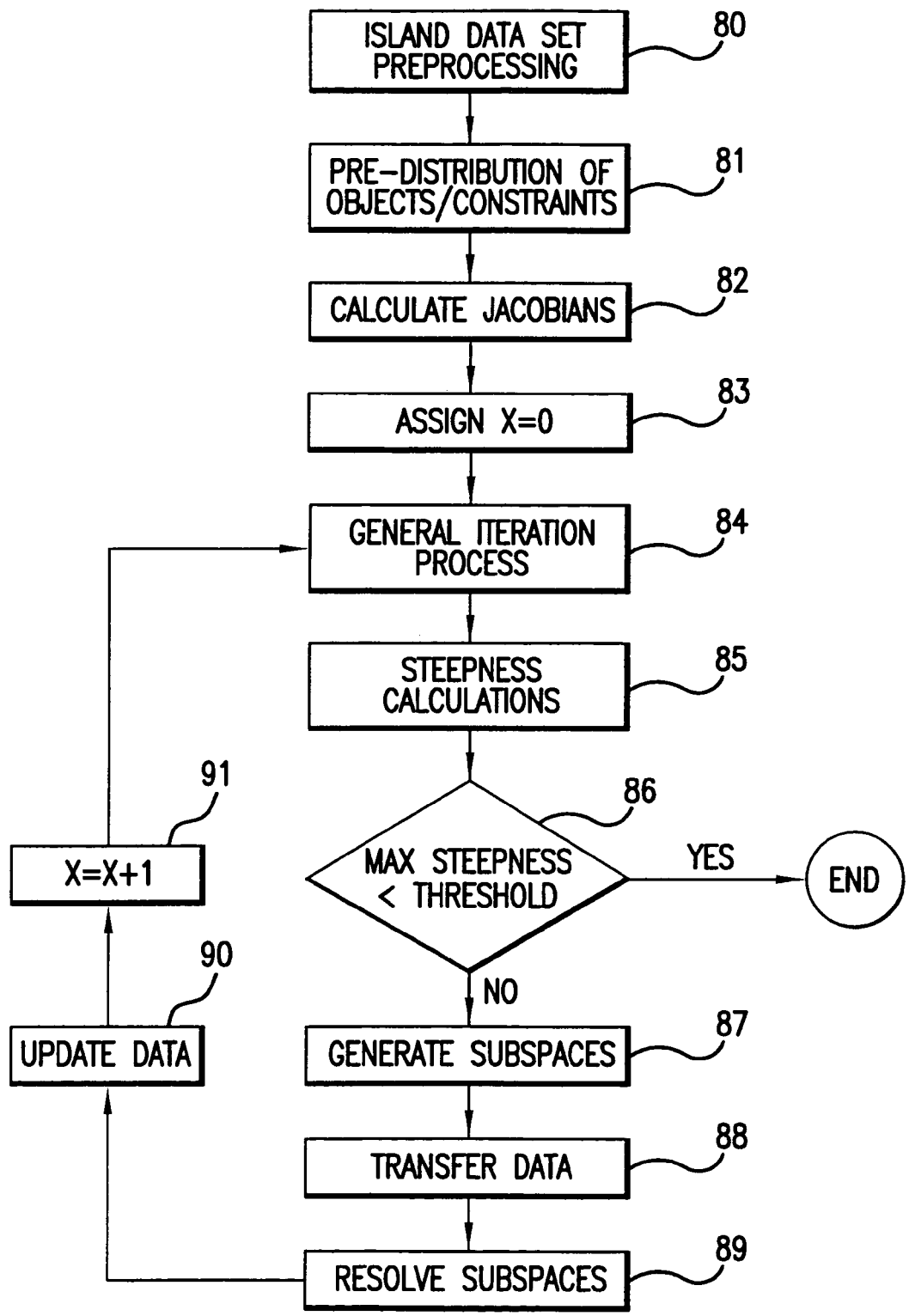

With reference to FIG. 8, the island data set is subjected to an initial preprocessing step (80) once received in IPE memory 52. Preprocessing includes a definition of initial subspaces in accordance with object/constraint connectivity relationships expressed in the island data set. In other words, subspaces are formed by grouping "associated constraint rows" in relation to a common object. Associated constraint rows are preferably, but necessarily, grouped such that all constraint rows arising from the same constraint are placed in the same subspace. This is particularly true for all constraint rows arising from a frictional contact between objects.

Once defined, data associated with each initial subspace is pre-distributed to a corresponding VPU memory (81). The corresponding VPU thereafter calculates corresponding Jacobian(s) for the initial subspace (82). The subspace data and calculated Jacobians are stored in IPE memory 52 and/or a selected VPU memory. Then, an iteration time step value of 0 is assumed (83).

Following pre-distribution of the initial subspaces and calculation of Jacobians, a general iteration process begins (84). In this process, for each subspace assigned to a VPU (i.e., an execution unit), the VPU calculates an "object steepness" which is equal to the greatest relative change value for constraint rows associated with an object in the subspace (85). Each respective object steepness is evaluated in ICU 52. Where the maximum object steepness falls below a defined minimum threshold, the general iteration process ends for that particular subspace (86=Yes). Where this is not the case (86=No), the general iteration process continues.

IPU 52 generates a number of subspaces, up to the maximum number of available execution units, to be resolved during a "current" iteration (87). Subspaces to-be-resolved are sequentially identified in accordance with a "greatest object steepness." Neighbored constraint rows associated with an object having the greatest object steepness are grouped into a common subspace wherever possible. The maximum number of grouped rows in a subspace will be determined by such factors as the rate of iteration time step, memory bandwidth capabilities, etc. During generation of the subspaces to-be-resolved in a particular iteration, it is preferred that each constraint row and object appear in only one subspace.

To better accomplish this preference, all constraint rows and objects are listed, using one of many conventional techniques, within each island data set, and marked off the list when grouped into a particular subspace. Each constraint row should be grouped with its neighbored constraint rows, unless a neighbored constraint row has already been marked off the list. However, an object associated with a constraint row may be included in a subspace only if it has not previously been included in another subspace. Omission of a constraint row or object from a particular subspace is usually not a problem since it is likely to be included in a subspace resolved during the next iteration.

Once subspaces have been generated and assigned to respective execution unit for resolution, Jacobian and Mass matrix data associated with the object(s) and constraint(s) in the subspace are also transferred from IPE memory 52 to a memory associated with the execution unit under the control of ICU 51 (88). With this data appropriately distributed, the plurality of execution units solve in parallel the plurality of subspaces using a competent computational method (89).

Following parallel resolution of the plurality of subspaces during an iteration "i", ICU 52 collects from each one of the plurality of VPUs the calculated changes in velocity $\Delta u_i$ and force $\Delta d_i$, and updates the overall velocity vector to be $u_i = u_i + \Delta u_i$, and constraint force vector $f_i = f_i + \Delta d_i$. ICU 52 thereafter distributes the updated velocity and constraint force vector information across the plurality of subspaces (90). Following update, the method increments the iteration step (91) and loops back to the beginning of the general iteration process.

Thus, instead of seeking to resolve (i.e., descend over or minimize in the working example) all constraint rows for the whole space during each computational method iteration, the present invention seeks to simultaneously resolve multiple selected subspaces, where each selected subspace contains a sequentially determined greatest object steepness. This approach suggests two implementation considerations. First, respective subspaces should be defined by their constituent constraint rows so as to minimize inter-subspace influences. That is, wherever possible, resolution of a subspace should not depend upon the resolution of a constraint row included in another subspace. Second, where the foregoing consideration is observed, the parallel computational scheme afforded by the present invention will run in a linear manner. That is, the speed of LCP convergence will be increased with the number of parallel execution units applied to the problem.

LCP resolution by subspace, as compared with whole space resolution, affords some interesting processing options. Heretofore, LCP resolution has been assigned to one and only one computational method or algorithm. That is, a single computational method is selected and consistently applied regardless of the particular nature of the physics-based data set, or objects within the data set. Within the context of the present invention, it is possible to evaluate the nature of defined subspaces and thereafter resolve the subspace using a particular computational method selected from a group of competent computational methods. For example, if a subspace contains only object(s) without contact constraints, a specialized bilateral constraint solver, such as Baraff's linear time algorithm disclosed in D. Baraff, "Linear-time dynamics using Lagrange multipliers," Tech Report CMU-RI-TR-95-44, Robotics Institute, Carnegie Mellon University, (January 1996), may be used to efficiently resolve the subspace. By rationally selecting a well-tailored computational method in relation to the actual nature of data associated with a subspace, LCP resolution speed may be further increased.

The present invention affords the designer of a parallel LCP solver with many advantages. For example, performance and accuracy may be traded-off by adjustments to the size of iteration steps and convergence thresholds. The parallel architecture of the present invention may be applied to single CPU platforms such as PCs, multiple CPU platforms such as game consoles, and systems incorporating a dedicated PPU running in cooperation with a system CPU.

Parallel resolution of subspaces derived from a whole gradient vector defining an LCP allow for real-time resolution of the LCP. Such real-time resolution provides enhanced visual effects to a main application incorporating physic-based animation features, such as rigid body dynamics.

The present invention has been taught in the context of several teaching examples. The scope of the invention is not limited to only the teaching examples, but extends to cover a scope defined by the attached claims.

What is claimed is:

1. A Linear Complementarity Problem (LCP) solver, comprising:
a plurality of Island Processing Engines (IPEs), wherein each IPE receives an island data set including a collection of data matrices and further comprises a plurality of parallel execution units, and each IPE is configured to distribute a first portion of the island data set representing first constraint rows of the collection of data matrices between the plurality of the execution units, so that a first portion of the first constraint rows associated with a first common object of the island data set is distributed to a first execution unit and a second portion of the first constraint rows associated with a second common object of the island data set is distributed to a second execution unit;
wherein each one of the plurality of execution units resolves a data portion of the first constraint rows derived from the island data set in parallel and resolves a data portion of second constraint rows representing a portion of the collection of data matrices serially, the second constraint rows being associated with both the first common object and the second common object.

2. The LCP solver of claim 1, wherein at least one of the plurality of execution units comprises a vector processor.

3. The LCP solver of claim 1, wherein each IPE further comprising:
an IPE memory storing the island data set;
an Island Control Unit (ICU) logically controlling the transfer of data from the IPE memory to the plurality of execution units.

4. The LCP solver of claim 3 wherein
a respective first data portion of the first constraint rows resolved by a first execution unit of the plurality of execution units is transferred from the first execution unit to a second execution unit of the plurality of execution units through the IPE memory.

5. The LCP solver of claim 3 wherein each IPE further comprises:
a Content Addressable Memory (CAM) operatively connected to the ICU and configured to store an entry for the first common object and the second common objects defined in the island data set.

6. The LCP solver of claim 1, wherein the second constraint rows are distributed to and resolved by the plurality of execution units after resolving of the first constraint rows is complete.

7. The LCP solver of claim 5, wherein the CAM is addressed using object identifers corresponding to the first common object, the second common object, and other objects defined in the island data set.

8. The LCP solver of claim 7, wherein a CAM entry for a particular object stores an identifier corresponding to one of the execution units in the plurality of execution units and a count of constraint rows that reference the particular object.

9. The LCP solver of claim 1, wherein the collection of data matrices represent changes to velocities and forces influencing movement of the first common object and the second common object.

10. The LCP solver of claim 9, wherein the plurality of execution units are further configured to perform an integration process to update positions of the first common object and the second common object.

11. A system executing a main application and comprising:
a Central Processing Unit (CPU), a main memory, and one or more peripherals including a display;
wherein the main memory stores an initial data set related to a physics-based problem arising from execution of the main application, the initial data set including a collection of data matrices;
the system further comprising a Linear Complementarity Problem (LCP) solver executing a projected iterative descent method adapted to resolve LCPs derived from the initial data set using a plurality of execution units arranged in parallel by distributing constraint rows of the data matrices that do not include a competing object pair to the plurality of execution units for processing in parallel and distributing constraint rows of the data matrices that do include a competing object pair to the plurality of execution units for serial processing, wherein the data matrices represent movements of a rigid body object associated with the main application.

12. The system of claim 11, wherein each one of the plurality of execution units comprises a circuit executing floating point operations.

13. The system of claim 12, wherein the initial data set is divided into a plurality of island data sets; and
wherein the LCP solver further comprises:
a plurality of Island Processing Engines (IPEs), wherein each IPE comprises a portion of the plurality of parallel execution units and an IPE memory storing one of the plurality of island data sets.

14. The system of claim 13, wherein each IPE further comprises an Island Control Unit (ICU) controlling the transfer of data from the IPE memory to the plurality of execution units.

15. The system of claim 14, wherein each one of the plurality of execution units comprises a Vector Processing Unit (VPU) having an associated VPU memory.

16. The system of claim 15, wherein each IPE further comprises:
a Content Addressable Memory (CAM) operatively connected to the ICU and configured to store common object information for the constraint rows in order to identify competing object pairs such that, by interoperation of the ICU and CAM, respective data portions are derived from the island data set and transferred to a corresponding VPU for resolution.

17. A system executing a main application and comprising:
a Central Processing Unit (CPU), a main memory associated with the CPU and one or more peripherals including a display;
wherein the main memory stores an initial data set including a collection of data matrices that is related to a physics-based problem arising from execution of the main application;
the system further comprising a Physics Processing Unit (PPU), the PPU comprising:
a PPU memory receiving and storing at least a portion of the initial data set, including a plurality of island data sets, each island data set corresponding to a rigid body island defined in the initial data set; and,
a Linear Complementarity Problem (LCP) solver executing a computational method adapted to resolve a plurality of LCPs, each LCP being derived from a corresponding island data set;
wherein the LCP solver comprises a plurality of execution units resolving the plurality of LCPs in parallel by distributing constraint rows of the data matrices that do not include a competing object pair to the plurality of execution units for processing in parallel and distributing constraint rows of the data matrices that do include a competing object pair to the plurality of execution units for serial processing.

18. The system of claim 17, wherein the LCP solver further comprises:
a plurality of Island Processing Engines (IPEs), each IPE receiving an island data set and further comprises a portion of the plurality of execution units;
wherein each one of the plurality of execution units resolves a data portion derived from the island data set.

19. The system of claim 18, wherein at least one of the plurality of execution units comprises a vector processor.

20. The system of claim 18 wherein each IPE further comprises:
an IPE memory storing the island data set;
an Island Control Unit (ICU) logically controlling the transfer of data from the IPE memory to the plurality of execution units.

21. The system of claim 20 wherein each execution unit further comprises an associated memory storing a respective data portion.

22. The system of claim 21 wherein each IPE further comprises:
a Content Addressable Memory (CAM) operatively connected to the ICU and configured to store common object information for the constraint rows in order to identify independent constraint rows of the island data set that do not include a competing object pair such that, by inter-operation of the ICU and CAM, each respective data portion is derived from the island data set.

23. The system of claim 20 wherein the PPU further comprises:
a PPU Control Engine(PCE) controlling overall operation of the PPU; and
a Data Movement Engine (DME) controlling the transfer of data between the main memory and the PPU memory and the transfer of data between the PPU memory and respective IPE memories associated with the plurality of IPEs.

24. A system of claim 23 wherein the PPU communicates data with at least one of the CPU and main memory via at least one protocol selected from a group of protocols defined by USB, USB2, Firewire, PCI, PCI-X, PCI-Express, and Ethernet.

25. The system of claim 17, wherein the PPU is implemented as a physically separate co-processor operating in conjunction with the CPU, and the LCP solver further comprises:
a plurality of Vector Processing Units (VPUs) connected in parallel and adapted to perform multiple floating point operations to simultaneously resolve the plurality of LCPs.

* * * * *